Sept. 22, 1925.
N. TRBOJEVICH
Re. 16,172
HOB
Original Filed Jan. 3, 1922 3 Sheets-Sheet 1
Fig. 1
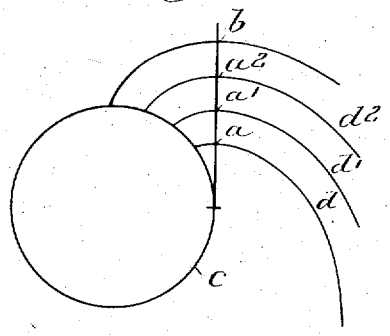
Fig. 2
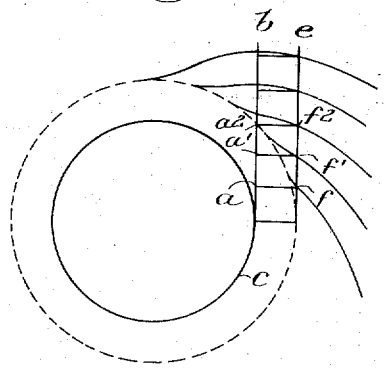
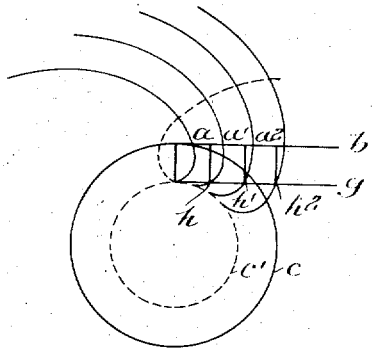
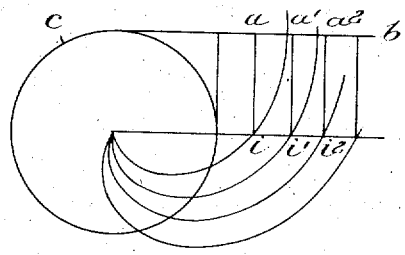
Fig. 3
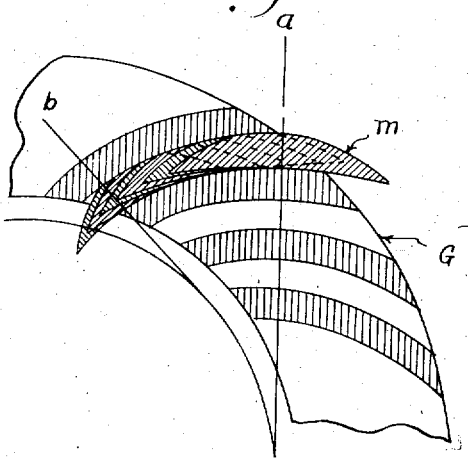
Fig. 4
Fig. 8.
Inventor
Nikola Trbojevich
By P. Schlesinger
his Attorney Sept. 22, 1925.

N. TRBOJEVICH

HOB

Original Filed Jan. 3, 1922 3 Sheets-Sheet 2.

Re. 16,172

Inventor
Nikola Trbojevich
By B. F. Schlemger
his Attorney

Sept. 22, 1925. Re. 16,172

N. TRBOJEVICH

HOB

Original Filed Jan. 3, 1922 3 Sheets-Sheet 3

Inventor
Nikola Trbojevich

By B. G. Shlaiger
his Attorney

Reissued Sept. 22, 1925. Re. 16,172

UNITED STATES PATENT OFFICE.

NIKOLA TRBOJEVICH, OF HIGHLAND PARK, MICHIGAN, ASSIGNOR TO GLEASON WORKS, OF ROCHESTER, NEW YORK, A CORPORATION OF NEW YORK.

HOB.

Original No. 1,465,151, dated August 14, 1923, Serial No. 526,512, filed January 3, 1922. Application for reissue filed March 14, 1925. Serial No. 15,665.

*To all whom it may concern:*

Be it known that I, NIKOLA TRBOJEVICH, formerly a subject of the King of Yugoslavia, but now a citizen of the United States, residing at Highland Park, in the county of Wayne and State of Michigan, have invented certain new and useful Improvements in Hobs, of which the following is a specification, reference being had therein to the accompanying drawings.

This invention relates to hobs and more particularly to hobs for producing gears.

One object of the invention is the provision of a hob, capable of producing symmetrical teeth on gear blanks, which will be easy to construct and which may be readily maintained in operative condition.

A further object is the provision of a hob which will produce teeth upon conical gear blanks without mutilation or interference.

Other objects will appear hereinafter from the specification and the appended claims.

The hob which forms the subject of this invention has been found to be especially useful in the production of bevel gears, or gears produced from conical blanks, and it is in connection with such gears that I shall describe its structure.

In the present state of the art hobbing is extensively used in the manufacture of spur gears where the teeth and interdental spaces are of uniform cross-section, but the methods employed are not applicable in the generation of teeth on conical blanks. The difficulties encountered are first, the changing pitch and changing tooth cross-section of the conventional straight tooth bevel gears, which render it impossible to produce such gears by an ordinary hob, and second, with bevel gears having spiral or curved teeth, or any gears produced from conical blanks and provided with longitudinally curved teeth, one surface is concave and of a curvature which would preclude the use of the ordinary cylindrical hob without interference. It has been proposed to use a conical hob, but these have required a helical thread of varying lead and the difficulties of manufacture and maintenance of such hobs are too great to render their use for this purpose practical. Furthermore, even if such hobs could be made, the gears generated thereby would be defective. With the hob which forms the subject of this invention, however, I have found it entirely possible to produce proper teeth upon conical blanks. I have discovered moreover, that this hob may be used in the manufacture of a novel type of gear, which is also my invention and which is claimed in a separate application.

For the purpose of clearly describing the structure of the hob which forms the subject of this invention, reference may be had to the accompanying drawings, in which I have illustrated one embodiment of the invention, it being understood, however, that my invention is not limited to the specific embodiment shown, but is capable of modification within the scope of the invention and the limits of the appended claims.

In the drawings:

Figures 1 to 4 show diagrammatically the geometrical principles involved;

Figure 8 is a diagrammatic view showing a section through the hob thread, taken in a plane tangent to its pitch surface, and showing various positions of the thread in cutting a conical gear blank.

To understand the improved construction of my hob, I have described it in connection with a novel form of gear which may be produced by this hob and in connection with the geometrical principles involved in the production of this novel form of gear. As shown in Figure 1, $a$ is a point on a line or string $b$ which is being unwound from a base circle or drum $c$ and which traces a curve $d$ that is an involute of a circle. A series of equi-spaced points $a$, $a'$, etc., will generate similar curves, all of which are parallel to each other. If the tracing points, instead of being directly in the line $b$, are in a line $e$ offset therefrom but parallel thereto and rigid therewith, as shown at $f$, $f'$ etc., in Figure 2, such points will generate curves which are non-parallel and outwardly divergent and may be designated as extended modified involute curves. If the offsetting of the line is inward from the base circle, as shown at $g$ in Figure 3, and then the equi-spaced points $h$, $h'$ etc., thereon will also trace non-parallel outwardly divergent curves which may be termed "abridged modified involute curves." If the inward offsetting of the line is equal to the radius of the base circle, as shown in Figure 4, the curves traced by the equi-spaced points $i$, $i'$, etc., are true Archimedean spirals; that is, there is a constant ratio between the vectorial angle and the radius vector.

It will be seen that the curves of the three above named series are non-parallel and are outwardly divergent. It is known from geometry that involutes only (not necessarily of a circle) form series of parallel curves. In that case the generating line is a common normal to every curve of the series. However, the first named curves are not common involutes because the generating line at every instant rotates about an offset point and, therefore, is not a normal to any curve of the series. Thus, the curves are non-parallel and the distance between two consecutive curves is always less than the spacing $ff'$, $f'f^2$, etc., of the generating line $e$ Figure 2. They are also outwardly divergent because they approach a series of parallel involutes asymptotically and the normal pitch (the shortest distance between two consecutive curves) also asymptotically approaches its maximum value $ff'$.

Figure 5:
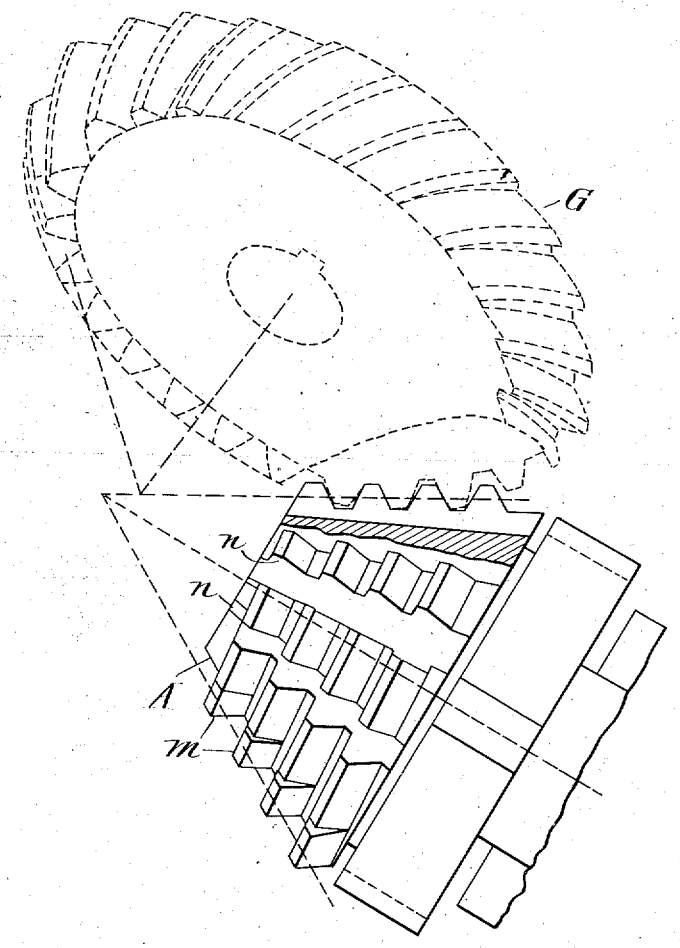
Figure 5 is a sectional elevation of the hob indicating a gear blank being operated upon, in dotted lines.
Figure 6:
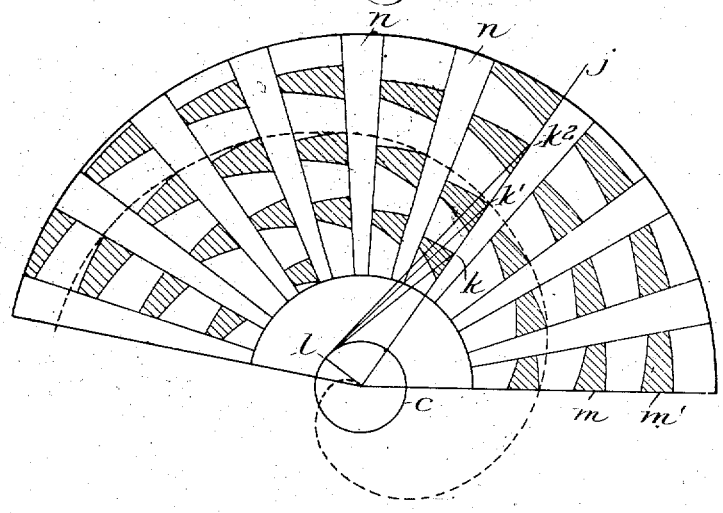
Figure 6 is the pitch cone development of a double threaded hob of the preferred form.

Figure 5 represents a preferred form of my invention, showing in side elevation a tapering hob A meshing with a spiral gear G of the improved construction, showing that the axial section of the hob forms a rack of constant pitch and engages the gear along a geodesic line that is a conical helix which in development coincides with the offset straight line $e$ of Figure 2. The hob is, therefore, of rack section along a generatrix of its pitch surface. Figure 6 is a development of a hob similar to that shown in Figure 5 taken in the pitch cone, all of the curves of which are Archimedean spirals. If any radial line $j$ be taken and normals are drawn from the several curves at the points of intersection with the line $j$, as indicated at $k$, $k'$, etc., these normal lines will all extend to a common point $l$ which point may be defined as the end of the polar subnormal belonging to the vector $j$. This is a well known property of the Archimedean spirals because those spirals are the only curves for which the length of the polar subnormal is the same for all points of the curve. The thread of the hob will intersect this radial line $j$ at increasingly acute angles, and since the angle formed by the normals and the radial line $j$ at the points of intersection of the thread with the radial line is different at each point of intersection, the hob will have a varying lead angle. The point $l$ lies on the base circle $c$ of the hob and is on a line perpendicular to the axis of the hob. Numerically, the length of the polar subnormal equals the lead of the spiral (in development) divided by $2\pi$, and is always measured perpendicular to the radius vector. Also, if the spacing of the curves in Figure 6 corresponds to the spacing of the points $i$, $i'$, etc., Figure 4, the one figure may be superimposed upon the other and both the curves and normal lines will coincide. Again, if the distance of the polar sub-normal from the radial center of Figure 6 is equal to the offsetting of the lines $e$ or $g$, Figures 2 and 3, and the curves are equally spaced along said lines, then Figure 6 may be placed on either of the Figures 2 or 3 with the respective curves tangent to each other. This relation will be true for any radial line $j$ and for any line $e$ or $g$ which is offset from the base circle a distance equal to the other polar sub-normal. Figures 2 and 3 are diagrammatic developments of the novel form of gear which may be produced with my hob, or the crown gear of a system of intermeshing gears of this novel form. The hob, hence, is capable of meshing with the crown gear, or the gear in development, along the line $j$ which coincides with the lines "$e$" or "$g$", i. e. along the straight line of contact between the pitch surfaces of the hob and crown gear.

From the geometrical principles above stated, it is evident that a tapering hob which is of constant lead and which therefore in development is an Archimedean spiral may be used for generating gear teeth of either the extended or abridged modified involute type and without interference or mutilation of one portion of the gear and the generation of another portion. It is, however, essential, for the production of theoretically correct gears of this type, that the distance between the axis of the hob and its polar sub-normal should correspond with the dimension of extension or abridgment of the gear tooth, and therefore in designing the hob the dimensions are selected with this in view. It is further necessary in the production of such gears that one side of the hob thread should be concave and that the cone angle of the hob should be such that the normal radius of curvature of the helicoidal face of the hob which cuts the concave side of the gear tooth should at all times be less than the normal radius of such concave face. This curvature may best be measured in a plane tangent to the pitch surface of the hob. The hob is, therefore, made preferably concave on the side facing the apex and convex on the other. The new hob will, as shown particularly in Figure 8, correctly produce curved teeth on conical blanks without mutilation, the hob thread being in, section, of general crescent shape and therefore capable of producing the desired tooth curvature. This figure shows the hob in its action on a gear blank G, the hob sweeping out a tooth space in its movement, relative to the blank, from position *a* to position *b*.

As specifically shown in Figure 6, the thread *m* of the hob is a double thread, but this is not essential as the hob will operate with either a single thread or a multiple thread.

The cutting edges are formed by longitudinally gashing the thread, as indicated at *n*, the number of these gashes determining the number of separate cuts that are taken in each revolution of the hob.

In computation of the polar subnormal of a certain hob only the well known mathematical rules need to be followed. The cone angle and the lead of thread in a hob (measured along the side and not along the axis of the hob), are known. From that the developed lead may be obtained as equal to the lead of the hob divided by the sine of the cone angle. By further dividing said quantity by $2\pi$, the exact value of the polar subnormal is obtained.

It is desirable that the modification of the tooth curves (preferably extended involutes) be exactly the same as the said polar subnormal. However, for practical purposes, there is considerable latitude permitted and satisfactory gears may be obtained by slightly departing from the theoretical figures. Such a departure may be advisable when the hob is larger in diameter than would be theoretically required. In such a case a slight decrease of the modification of the tooth curves serves to compensate for the oversize hob.

While I prefer, on account of its simplicity in construction, to use a hob which in its development is an Archimedean spiral, it is possible to form a hob of other curves of the modified involute type, it being only essential to select said curve, when used in the production of curved tooth bevel gears, so as to be equal in extension or abridgment to the curve to be generated thereby.

Figure 7:
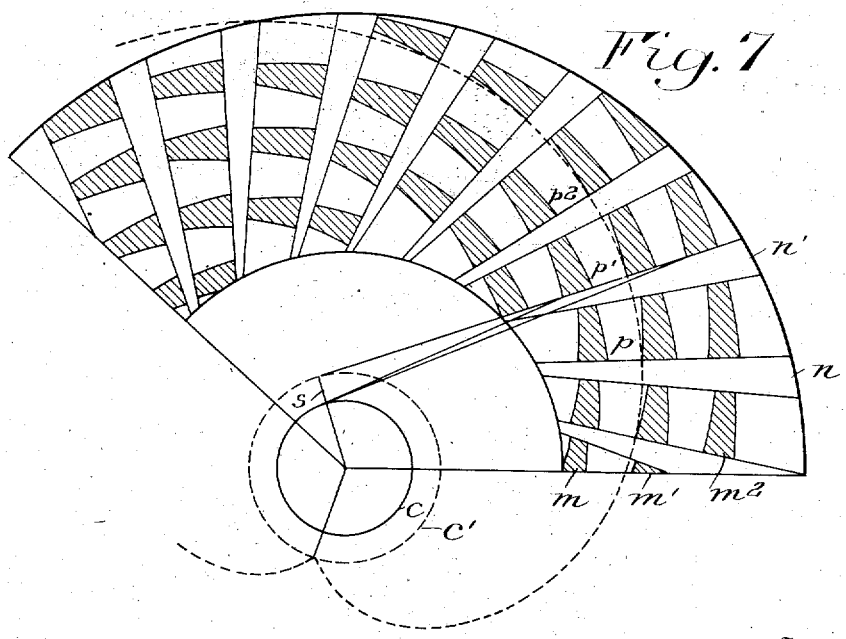
Figure 7 is a similar view of a modified construction.

In Figure 7 the pitch cone development of a hob of general involute character is shown. The cutting teeth $p$, $p'$, $p^2$ are arranged on the face of a truncated cone body in a series of thread lines $m$, $m'$, etc., which form similar extended involutes developed from the base circle $c$ with the modification or offset $s$. The cutting edges are formed by a series of equally spaced gashes or flutes $n$, $n'$, etc., which are substantially perpendicular to the thread lines $m$, $m'$, etc., and may be either straight or curved. The remaining portions of the thread are relieved to form cutting edges, as will be understood. Such hobs are sharpened by grinding the faces of the flutes, similarly to the process employed for sharpening of the ordinary hobs.

While I have described my invention in connection with the production of a particular type of gear it is to be understood that the structure or use of the hob may be modified or varied without departing from the intention of the invention or the scope of the following claims, and that this application is intended to cover any adaptations or embodiments, following, in general, the principles of the invention and including such departures from the present disclosure as come within known or customary practice in gear cutting and may be applied to the essential features hereinbefore set forth and as fall within the limits of the appended claims.

Having thus described my invention, what I claim is:

1. A hob or cutter for the generation of spiral bevel gears comprising a tapering helix which in development and in comparison with the development of the gear generated thereby has longitudinal tooth curves traced by points equispaced from lines rolling on the base circles respectively of the hob and gear.

2. A hob or cutter for generating spiral bevel gears comprising a tapering helix which in development is an Archimedean spiral having a polar sub-normal selected to correspond with the modification of the longitudinal tooth curves of the gear from involutes of a circle.

3. A hob or cutter for the generation of spiral bevel gears comprising a tapering helix which in geodesic section forms a rack of constant pitch and which in development forms a series of longitudinal tooth curves of modified involute form and having a predetermined relation to the longitudinal tooth curves of the gear generated thereby.

4. A hob or cutter for the generation of spiral bevel gears comprising a truncated tapering helix which in axial section forms a rack of constant pitch and which in development forms an Archimedean spiral having a polar sub-normal selected with respect to a predetermined longitudinal tooth curve of modified involute form in the gear to be generated.

5. A hob or cutter for spiral bevel gears comprising a truncated tapering helix longitudinally gashed to form cutting edges, said helix forming in the axial section of the hob a rack of constant pitch and in development forming Archimedean spiral curves having a polar sub-normal selected with reference to predetermined longitudinal tooth curves of modified involute form in the gear to be generated.

6. A hob or cutter for the generation of spiral bevel gears comprising a body having a tapering helical thread which in axial section forms a rack of constant pitch and which in development forms non-parallel modified involute curves, said curves being generated by a rack of constant pitch spaced from and parallel to a line rolling on a base circle of predetermined radius.

7. A hob or cutter comprising a tapering helix longitudinally gashed to form cutting edges, said helix forming in geodesic section a rack of constant pitch and in development forming a spiral of the general involute type.

8. A hob or cutter comprising a body having a tapering helical thread longitudinally gashed and transversely relieved to form cutting edges, said thread being capable of meshing with a rack element of constant pitch along a series of geodesic lines and forming in development a spiral of the general involute type.

9. A hob or cutter comprising a frusto-conical body provided with a tapering helical thread, which, in development, forms a spiral of the general involute type, said thread being capable of meshing with a rack element of constant pitch along a series of geodesic lines and being longitudinally gashed and transversely relieved to form cutting edges.

10. A hob formed by gashing a thread which presents a series of curves in development which are of constant lead.

11. A taper hob formed by gashing a thread which presents a series of curves in development which are of constant lead and of rack section along a generatrix of the pitch surface of the hob.

12. A hob formed by gashing a thread one side of which in a section through the thread in a plane tangent to the pitch surface, thereof, is concave.

13. A taper hob formed by gashing a thread having a pressure angle, on the side facing the apex of the hob, less than the pitch cone angle of the hob.

14. A taper hob formed by gashing a thread which in section in a plane tangent to its pitch surface is of general crescent shape.

15. A taper hob formed by gashing a thread having a pressure angle on the side facing the apex of the hob less than the pitch cone angle of the hob and having a pressure angle on the opposite side greater than the pitch cone angle of the hob.

16. A hob formed by gashing a thread the perpendiculars to which at the pitch surface along a straight line in development meet in a single point.

17. A taper hob formed by gashing a thread the perpendiculars to which at the pitch surface along a radial line in development meet in a single point.

18. A hob formed by gashing a continuous thread the perpendiculars of which along a generatrix of the pitch surface of the hob in development intersect in a point.

19. A hob formed by gashing a continuous thread perpendiculars to which along a generatrix of the pitch surface of the hob in development intersect in a point which lies in a line at right angles to the hob axis.

20. The hob formed by gashing a continuous thread the perpendiculars to which along a generatrix of the pitch surface of the hob in development intersect in a point lying on the base circle of the hob.

21. A taper hob having teeth the normals to which at the pitch surface in development along any radial line intersect in a single point which is at a distance from the apex of the hob equal to the polar sub-normal thereof.

22. A taper hob formed by gashing a thread which in development intersects a straight line at increasingly acute angles.

23. A taper hob formed by gashing a continuous thread of constant pitch along a straight line generatrix of its pitch surface.

24. A taper hob formed by gashing a continuous thread which in axial section forms a rack of constant pitch.

25. A taper hob adapted to mesh with a basic crown gear whose teeth in a section offset from its center form a rack of constant pitch.

26. A hob formed by gashing a thread which in development forms a spiral of the general involute type.

27. A hob formed by gashing a thread of constant pitch which in development forms a spiral of the general involute type.

28. A taper hob formed by gashing a thread which in development forms an Archimedean spiral.

29. A taper hob formed by gashing a thread which in development forms a spiral of the general involute type.

30. A hob comprising a frusto-conical body provided with a continuous thread, which in development forms a spiral of the general involute type, said thread being capable of meshing with a rack element of constant pitch along a straight line generatrix of pitch surface of hob, said thread being gashed and relieved to form cutting edges.

NIKOLA TRBOJEVICH.